United States Patent [19]

Stevens

[11] Patent Number: 4,878,515
[45] Date of Patent: Nov. 7, 1989

[54] WATER ACCESS PREVENTER

[76] Inventor: Robert B. Stevens, P. O. Box 26284, Honolulu, Hi. 96825

[21] Appl. No.: 254,574

[22] Filed: Oct. 7, 1988

[51] Int. Cl.4 ........................ F16K 24/00; F16K 35/06
[52] U.S. Cl. ................................... 137/218; 137/107; 137/800; 251/90; 251/93
[58] Field of Search ............... 137/107, 215, 218, 800; 138/89; 251/90, 93, 89

[56] References Cited

U.S. PATENT DOCUMENTS

| | | | |
|---|---|---|---|
| 1,595,186 | 8/1926 | Gray | 138/89 |
| 2,069,849 | 2/1937 | Rich | 138/89 |
| 2,620,816 | 12/1952 | Griswold | 137/218 |
| 3,070,115 | 12/1962 | Jester | 137/800 X |
| 3,090,218 | 5/1963 | Birkness | 137/383 X |
| 3,173,439 | 3/1965 | Griswold et al. | 137/107 |
| 3,724,487 | 4/1973 | Hunter | 137/218 |
| 3,918,477 | 11/1975 | Grams | 137/218 |
| 3,929,152 | 12/1975 | Graham | 137/800 X |

Primary Examiner—Gerald A. Michalsky

[57] ABSTRACT

A water access preventer for testable water backflow prevention assemblies wherein a means is provided to quickly, inconspicuously, and inexpensively prevent unauthorized access to potable water travelling within these assemblies throughout the differential pressure gradient of these assemblies, comprising, in part: a means for locking the valves which provide access to the potable water, and a means for preventing the shutoff of linepressure throughout the differential pressure gradient of the device.

18 Claims, 3 Drawing Sheets

WATER ACCESS PREVENTER

BACKGROUND OF THE INVENTION

1. Field of Invention

This invention relates to testable potable water backflow prevention devices and the risk of accidental or intentional contamination to a specific water consumer that these devices pose, by virtue of the differential pressure gradient inherent to these devices, and the ease of access to the potable water supply throughout the differential pressure gradient of these devices. This invention prevents unauthorized access to, use of, or shutoff of a specific users potable water supply.

2. Description of the Prior Art.

Thousands of testable backflow prevention devices have been installed on potable water lines to prevent contamination of public drinking water supplies. Whenever a water consumer creates a cross-connection or potential backflow contamination condition the water consumer is required to install and maintain a backflow prevention device on their water line to prevent contaminated or polluted water from entering the public drinking water supply. The most common location for installation is after the water meter but before any branch piping. These devices are most commonly seen serving high-rise buildings, commercial and industrial facilities, pharmaceutical plants, hospitals, airports, schools, dairies, farms, nursing homes, military bases, bottling plants and restricted access areas.

Testable backflow prevention devices work by means of multiple check valves and zone differential pressure sensing valves. There is a pressure drop, also referred to as head loss, across any check valve assembly that is working properly. Test cocks are located before and after each check valve for testing this differential pressure as well as the ability for the check valves to seal against backflow of water. In most backflow prevention assemblies there are four test cocks. Although these test cocks are intended to be used only for testing the device, and then only by certified technicians, their significance and function is not generally understood; it is common to see hose-bibs and other connections made to the test cocks of these devices. What very few people realize is that there exists a pressure differential across the check valve assembly. It is fairly common to see a hose-bib connection to one of the first test cocks of the device; a connection prohibited by water purveyors. A further problem is the entire device may be by-passed by connection a hose from the first or second test cock to the fourth test cock. Because the hose represents a virtually resistance free route, the water will travel through the by-pass hose and the backflow preventer will no longer be functional. Worse still is the potential for accidental or intentional selective contamination of a specific consumer's water supply. At present, very few, if any, people realize how quickly and easily a specific consumer's water can be contaminated, intentionally or accidentally, through a testable backflow prevention assembly without contaminating the potable water supply at large. This invention is designed to prevent either accidental or intentional contamination of a consumer's water supply and be non-obvious, both visibly and functionally.

A partial search of U.S. Patents in Classes 70, 138, 279 and 285 did not reveal any such device as designed or claimed in my invention. This is not surprising; presently, the hazard is not generally perceived even by those deemed most responsible for or knowledgeable of backflow prevention devices.

SUMMARY OF THE INVENTION

An object of the invention is to prevent siphonage of contaminated fluid into the drinking water supply.

A further object of the invention is to prevent selective contamination of a specific water consumer.

A further object of the invention is to prevent unauthorized use of water.

A further object of the invention is to maintain pressure throughout the differential pressure gradient of a testable backflow prevention device.

A further object of the invention is to prevent discharge of water through improper shut-off of a testable backflow prevention device.

A further object of the invention is to prevent theft of all or part of a testable backflow prevention device.

A further object of the invention is to be inconspicuous.

Other objects and advantages of the invention will become apparent from the following description.

BRIEF DESCRIPTION OF THE DRAWING

In order that the invention may be more readily understood, reference will now be made to the accompanying drawings which show one embodiment thereof by way of example and in which.

DESCRIPTION OF THE PREFERRED EMBODIMENT

Before explaining the present invention in detail it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not limitation.

Figure 1:
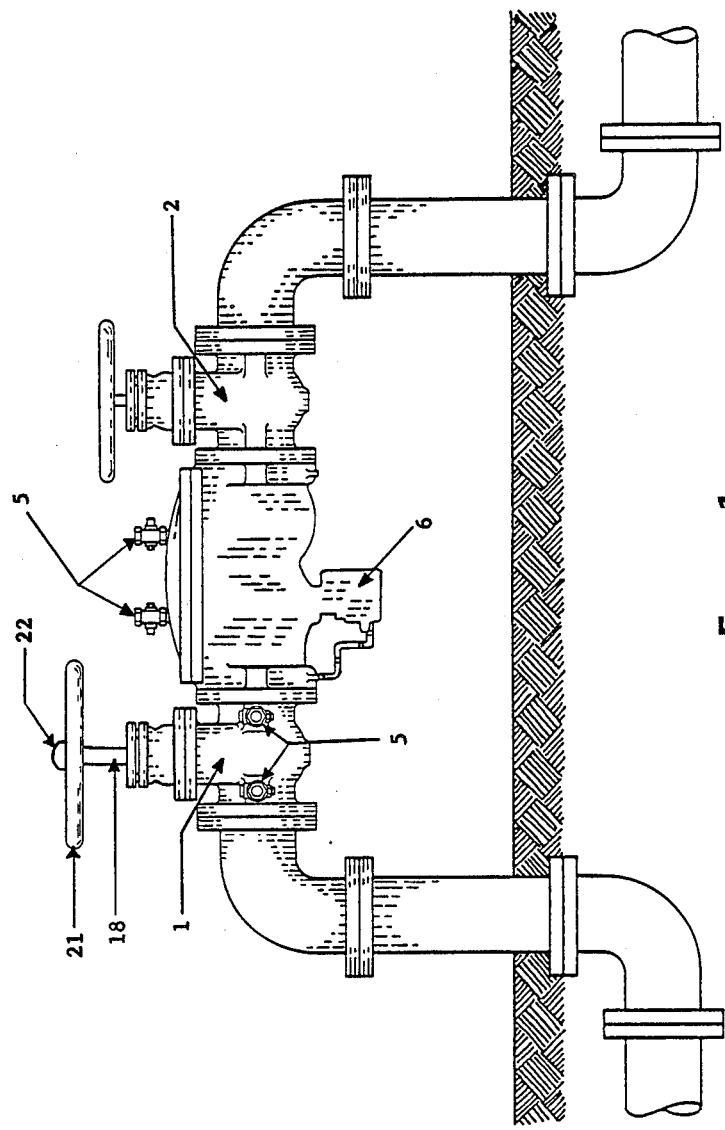
FIG. 1 is a front elevation view showing a typical installation.
Figure 2:
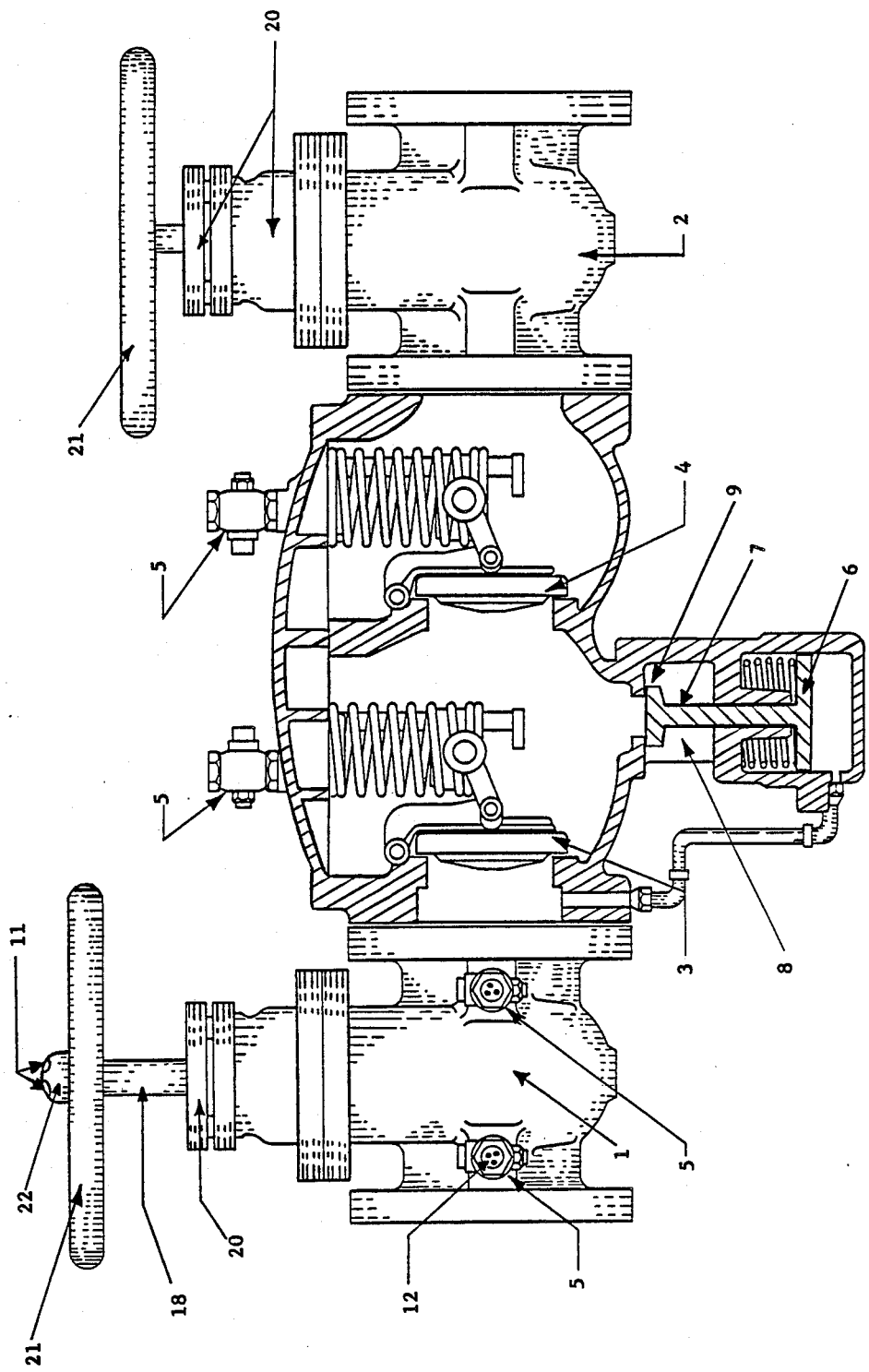
FIG. 2 is a front elevation view in partial section.
Figure 5:
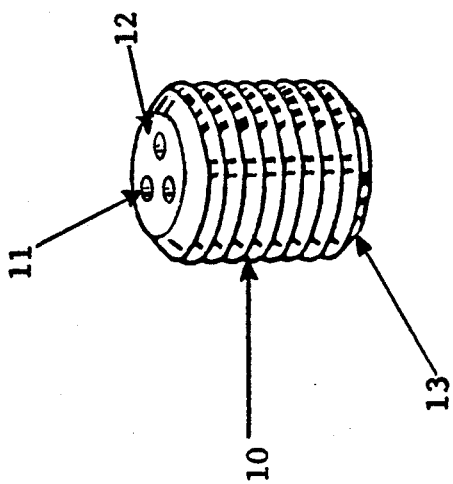
FIG. 5 is an upper-front perspective view of an externally threaded plug.
Figure 6:
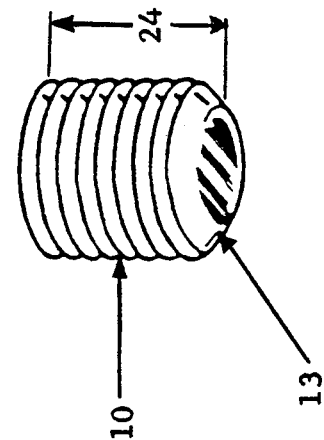
FIG. 6 is a lower-front perspective view of an externally threaded plug.
Figure 4:
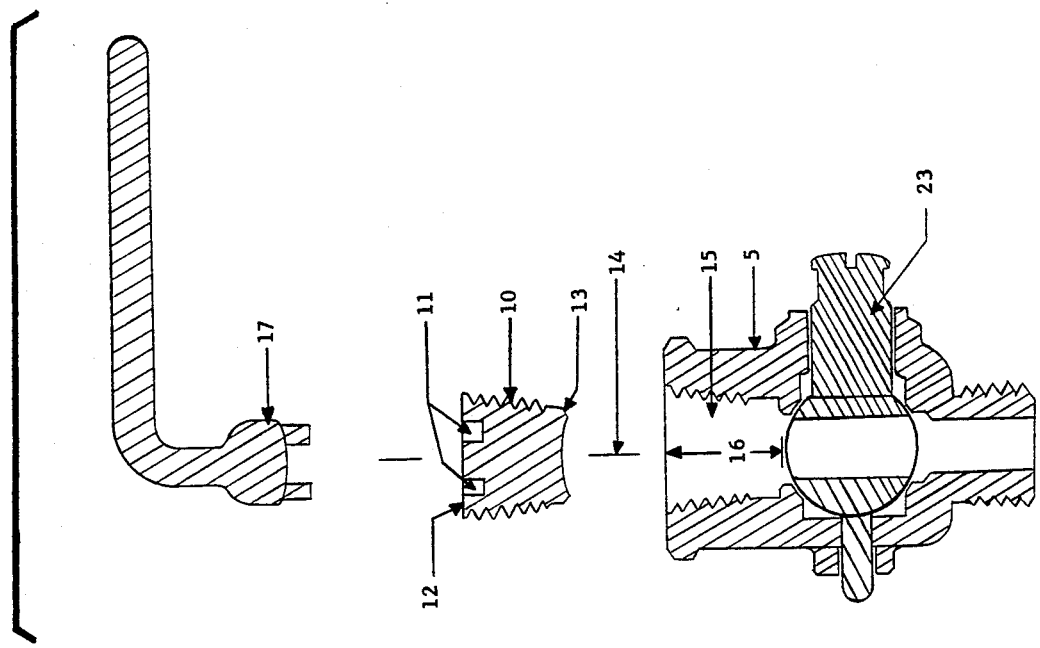
FIG. 4 is a partial sectional view.
Figure 3:
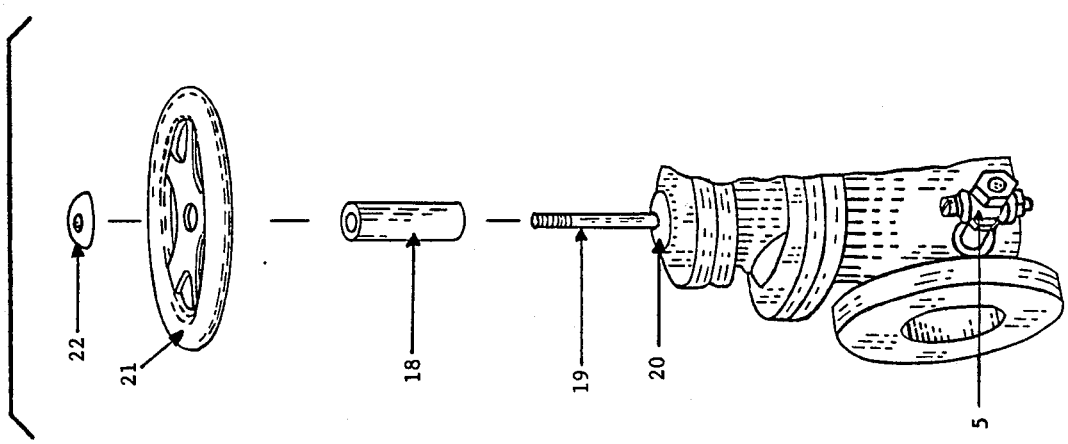
FIG. 3 is a partial left-front perspective view, showing the upstream gate valve.

Referring now to the drawings wherein like reference numerals refer to like and corresponding parts throughout the several views, the preferred embodiment of the invention is disclosed in FIG. 1 through 6 inclusive.

The invention includes an upstream gate valve 1, downstream gate valve 2, between which is located a primary check valve 3, secondary check valve 4 and a zone differential pressure sensing valve 6 that monitors the pressure differential across the primary check valve 3, and, when this differential pressure decreases to within a given value, opens the relief valve 7 that discharges water between the primary check valve 3 and secondary check valve 4 through a discharge port 8, and allows air to enter through the air inlet valve 9 thereby preventing back siphonage.

Upstream of the upstream gate valve 1 is an internally threaded test cock 5 that provides direct access to the water within the device. Another internally threaded test cock 5 is located between the upstream gate valve 1 and the primary check valve 3. Another internally threaded test cock 5 is located between the primary check valve 3 and the secondary check valve 4. Another internally threaded test cock 5 is located between the secondary check valve 4 and the downstream gate valve 2. Due to the pressure gradient across the check valves, if a hose were connected to two or more test cocks, water would flow through the hose and entrain any liquid connected to the hose system. The variety of potentially hazardous connections is numerous.

The externally threaded plug 10 is designed to lock an internally threaded test cock 5 by threading into a test cock receiving body 15 where the externally threaded plug 10 has a seating surface 13 that secures to the test cock receiving body 15 near the ball valve 23 of the internally threaded test cock 5. The axis length 24, measured along the axis line 14, represents the distance between the seating surface 13 and the beginning of the external face 12, of the externally threaded plug 10. The axis length 24, is less than the receiving body axis length 16 of the internally threaded test cock 5 thereby permitting the plug's external face 12 to be flush with or recessed within the test cock's receiving body 15. To secure or remove the externally threaded plug 10 a mating mortise 11 on the plug's external face 12 mates with a tenon key 17 such that the tenon key 17 is required to either secure or remove the externally threaded plug 10.

The upstream gate valve 1 is secured in the continuously open position by a tubular extension sleeve 18 that fits around the gate valve stem 19 between the gate valve handle 21 and the gate valve housing 20. A round and hemispheric mortise fitting 22 secures the gate valve handle 21 to the gate valve stem 19. The mortise fitting 22 is secured and removed by tenon key 17.

I claim as my invention:

1. A water access preventer for a testable backflow prevention assembly said assembly comprising: an upstream gate valve, a primary check valve, a secondary check valve, a zone differential pressure sensing valve, a relief valve, a discharge port, a downstream gate valve, an internally threaded test cock located upstream of the upstream gate valve, an internally threaded test cock located between the upstream gate valve and the primary check valve, an internally threaded test cock located between the primary check valve and the secondary check valve, and an internally threaded test cock located between the secondary check valve and the downstream gate valve; wherein a means is provided to prevent access to potable water with the backflow prevention assembly said means comprising: an externally threaded plug, for each of the four test cocks, wherein each plug is designed to mate with the internal threading of test cock, and wherein a means is provided to lock each plug within a test cock such that a key is required to unlock or remove each plug from a test cock, and, wherein, a means is provided to prevent closure of the upstream gate valve.

2. The water access preventer of claim 1 wherein the means for locking each plug within a test cock is comprised of: a seating surface of the plug's leading face, an external face, mating mortise on the external face and the tenon key that mates with the mating mortise.

3. The water access preventer of claim 2 wherein the means provided to prevent closure of the upstream gate valve comprises: a tubular extension sleeve that surrounds the upstream gate valve stem, and a means for locking the tubular extension sleeve to the upstream gate valve stem.

4. The water access preventer of claim 3 wherein the means for locking the tubular extension sleeve to the upstream gate valve stem comprises: a nut or bolt fitting with a substantially round and hemispheric head, said head comprising a mating mortise that mates with a tenon key.

5. The water access preventer of claim 1 wherein the means provided to prevent closure of the upstream gate valve comprises: a tubular extension sleeve that surrounds the upstream gate valve stem, and a means for locking the tubular extension sleeve to the upstream gate valve stem.

6. The water access preventer of claim 5 wherein the means for locking the tubular extension sleeve to the upstream gate valve stem comprises: a nut or bolt fitting with a substantially round and hemispheric head, said head comprising a mating mortise that mates with a tenon key.

7. A water access preventer for a testable backflow prevention assembly said assembly comprising: an upstream gate valve, a primary check valve, a secondary check valve, a downstream gate valve, an internally threaded test cock located upstream of the upstream gate valve, an internally threaded test cock located between the upstream gate valve and the primary check valve, an internally threaded test cock located between the primary check valve and the secondary check valve, and an internally threaded test cock located between the secondary check valve and the downstream gate valve; wherein a means is provided to prevent access to potable water within the backflow prevention assembly said means comprising: an externally threaded plug, for each of the four test cocks, wherein each plug is designed to mate with the internal threading of a test cock, and wherein a means is provided to lock each plug within a test cock such that a key is required to unlock or remove each plug from a test cock, and, wherein, a means is provided to prevent closure of the upstream gate valve.

8. The water access preventer of claim 7 wherein the means for locking each plug within a test cock is comprised of: a seating surface on the plug's leading face, an external face, mating mortise on the external face and a tenon key that mates with the mating mortise.

9. The water access preventer of claim 8 wherein the means provided to prevent closure of the upstream gate valve comprises: a tubular extension sleeve that surrounds the upstream gate valve stem, and a means for locking the tubular extension sleeve to the upstream gate valve stem.

10. The water access preventer of claim 9 wherein the means for locking the tubular extension sleeve to the upstream gate valve stem comprises: a nut or bolt fitting with a substantially round and hemispheric head, said head comprising a mating mortise that mates with a tenon key.

11. The water access preventer of claim 7 wherein the means provided to prevent closure of the upstream gate valve comprises: a tubular extension sleeve that surrounds the upstream gate valve stem, and a means for locking the tubular extension sleeve to the upstream gate valve stem.

12. The water access preventer of claim 11 wherein the means for locking the tubular extension sleeve to the upstream gate valve stem comprises: a nut or bolt fitting with a substantially round and hemispheric head, said head comprising a mating mortise that mates with a tenon key.

13. A water access preventer for a testable backflow prevention assembly said assembly comprising: an upstream gae valve, a primary check valve, an air inlet valve, a downstream gate valve, an internally threaded test cock located between the upstream gate valve and the primary check valve, and an internally threaded test cock located between the primary check valve and the air inlet valve; wherein a means is provided to prevent access to potable water within the backflow prevention assembly said means comprising: an externally threaded plug, for each of the two test cocks, wherein each plug is designed to mate with the internal threading of a test cock, and wherein a means is provided to lock each plug within a test cock such that a key is required to unlock or remove each plug from a test cock, and, wherein, a means is provided to prevent closure of the upstream gate valve.

14. The water access preventer of claim 13 wherein the means for locking each plug within a test cock is comprised of: a seating surface on the plug's leading face, an external face, mating mortise on the external face and a tenon key that mates with the mating mortise.

15. The water access preventer of claim 14 wherein the means provided to prevent closure of the upstream gate valve comprises: a tubular extension sleeve that surrounds the upstream gate valve stem, and a means for locking the tubular extension sleeve to the upstream gate valve stem.

16. The water access preventer of claim 15 wherein the means for locking the tubular extension sleeve to the upstream gate valve stem comprises: a nut or bolt fitting with a substantially round and hemispheric head, said head comprising a mating mortise that mates with a tenon key.

17. The water access preventer of claim 13 wherein the means provided to prevent closure of the upstream gate valve comprises: a tubular extension sleeve that surrounds the upstream gate valve stem, and a means for locking the tubular extension sleeve to the upstream gate valve stem.

18. The water access preventer of claim 17 wherein the means for locking the tubular extension sleeve to the upstream gate valve stem comprises: a nut or bolt fitting with a substantially round and hemispheric head, said head comprising a mating mortise that mates with a tenon key.

* * * * *

UNITED STATES PATENT AND TRADEMARK OFFICE
CERTIFICATE OF CORRECTION

PATENT NO. : 4,878,515

DATED : Nov. 7, 1989

INVENTOR(S) : Robert B. Stevens

It is certified that error appears in the above-identified patent and that said Letters Patent is hereby corrected as shown below:

Column 3, line 55, "with" should read --within--.
        line, 59, after "of" insert --a--.

Column 5, line 9, "gae" should read --gate--.

Signed and Sealed this

Twenty-second Day of October, 1991

Attest:

HARRY F. MANBECK, JR.

*Attesting Officer*          Commissioner of Patents and Trademarks